(12) United States Patent
Kitayama

(10) Patent No.: US 6,363,397 B1
(45) Date of Patent: Mar. 26, 2002

(54) METHOD FOR SELECTING OBJECTS TO BE CACHED, METHOD FOR DISCARDING CACHED OBJECTS, AND COMPUTER

(75) Inventor: Fumihiko Kitayama, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/247,397

(22) Filed: Feb. 10, 1999

(30) Foreign Application Priority Data

Feb. 10, 1998 (JP) .......................................... 10-028228

(51) Int. Cl.⁷ .............................. G06F 17/00; G06F 7/00
(52) U.S. Cl. .................................... 707/103 R; 711/118
(58) Field of Search .............................. 707/100, 103; 711/113, 118, 126, 154, 159

(56) References Cited

U.S. PATENT DOCUMENTS 5,390,318 A  *  2/1995  Ramakrishnan et al. .... 711/158
5,781,924 A  *  7/1998  Zaitzeva et al. ............ 711/131

* cited by examiner

*Primary Examiner*—John Breene
*Assistant Examiner*—Susan Rayyan
(74) *Attorney, Agent, or Firm*—Scully, Scott, Murphy & Presser; Gail H. Zarick, Esq.

(57) ABSTRACT

The present invention is directed to a method for dynamically changing objects to be cached in accordance with the processes performed. More particularly, the method for selecting objects to be cached in a data structure of classes of objects hierarchically arranged in a plurality of levels (L1, L2, L3, . . . ) comprises the steps of: in response to that a first object (a) of a first class at a specific level (L2) refers to a second object (b) of a second class at a different level (L3), detecting classes belonging to the different level (L3); and specifying, as objects to be cached, objects (b, c, d and e) at the different level (L3) that have not yet been cached and that can be traced, starting at the first object (a) of the first class.

16 Claims, 5 Drawing Sheets

● KEY OBJECT
○ OBJECT

METHOD FOR SELECTING OBJECTS TO BE CACHED, METHOD FOR DISCARDING CACHED OBJECTS, AND COMPUTER

BACKGROUND OF THE INVENTION

1. Technical Field

The present invention relates to an object caching method, particularly to a data structure wherein classes of objects are hierarchically arranged in a plurality of levels, the caching of objects in the data structure, and the discarding of cached objects.

2. Prior Art

As the use of the Internet and Intranet has spread, various computer application programs are being executed in a distributed environment. In addition, object oriented techniques are being employed at the design and analysis stage for the development of application systems, and various data are being expressed as objects in the implementation and stored in distributed computers. Furthermore, computers, such as network computers (NCs) or portable PDAs, whose resources, such as main memories and computation capacities, are quite limited, are frequently being employed.

In such an environment, generally, a local terminal accesses to objects stored in a remote computer. However, taking into consideration the capacity of the terminal and the speed of a network, it is apparent that caching objects required by a terminal in the terminal is a good idea for a program that processes many remote objects. The required object, however, should not be cached as an individual object, but should be cached as one unit of objects constituting a network structure that will be accessed later. This reason can be derived from well-known characteristic of object oriented programming; that is, (1) a lot of messages are transmitted to objects during a process, and the objects which received the messages further may send messages to objects associated with themselves; and (2) as a result of repeating the above process, accesses to a lot of objects associated with each other is frequently performed.

Assume that one part of data in a database is employed as an object to be processed. In actual program development, specifically, legacy database systems are employed unchanged in many cases, and data in such a database can not be accessed as objects. Therefore, only data to be processed is converted into objects and they are copied to an accessible area. In this case, not only a single object but also the associated objects are required for the processing.

As described above, the procedure employed to determine which objects are to be cached has a great influence on the performance at the terminal. Some conventional methods for determining the range of objects to be cached will now be described.

In the object serialization in Java (trademark owned by Sun Microsystems), when a specific object is designated, basically, all the objects that can be reached from the object through references are to be serialized. The basic algorithm is as follows. If a reference to an object appears at the first time during the copying, a reference number is added to the object and the copying process is repeated recursively. As a reference to the same object appears, the number that was assigned to the object at the first appearance is transmitted instead of the object itself. In this manner, a network structure comprising objects that can be traced can be completely transmitted.

This method prevents the omission of objects, but predicting and controlling the quantity of data to be transmitted is difficult, and care should be taken when a network structure is transmitted that comprises many coupled objects. Java RMI (Remote Method Invocation) makes the control possible to a degree by using a transient value for the objects. However, since this is statically determined during the programming and can not be dynamically changed in accordance with various execution situations, this method lacks flexibility.

When the contents of a database are substantially converted into objects, a technique is employed where, although it depends on the architecture of the database system, a local pointer and a global pointer are used in the class definition to limit in advance the transfer range of the objects (see Container Object ("Data Model and C++ interface For Object Server Built Like Relational Database," Fukuda et. al., 45th Information Processing Meeting (latter half of 1992) (4), p.4–111) and Entity/Dependent ("San Francisco Project Technical Summary," IBM, http://www.ibm.com/Java/ Sanfrancisco)). However, it is difficult to dynamically change a target to be transferred and a transfer range each time processing is performed.

There is another method that employs a cluster concept to transfer all objects in an associated cluster substantially unchanged (see ObjectStore ("User Guide ObjectStore Release 3.0 For OS/2 and AIX/xlc System," Object Design Inc., January 1994, pp. 42 to 44)). According to this method, a cluster is specified when an object is instantiated in a secondary storage. Actually, when a hardware page in the secondary storage and in a main memory is employed as a cluster unit, calculations performed by a CPU during the transfer, such as tracing of the object references, are not required, and then more efficient caching is provided. However, since the objects in the cluster are transferred unconditionally, unnecessary objects may be transferred, depending on a method for constructing the cluster. Particularly when much transfer time is required in a distributed environment, the volume of the data communication involved is increased and the performance is deteriorated. In addition, while this method provides control to a degree (it enables selection of a policy for caching) by the cluster unit, it cannot cope with dynamic changes of objects during the execution, especially changes on an object network after the objects are instantiated.

For an application program or a framework, object designers implement a method of caching. If they prepare a program very carefully, this program is quite flexible and provides satisfactory effects. However, this requires a high degree of programming skill, and in particular, it is difficult to maintain the consistency of the reference relationship in the cache when the cached objects are released.

If caching is forcedly released while the above described network structure composed of the objects is being cached, this leads to the illegal release of objects and to the illegal accesses to invalid objects. This occurs because an object can be shared by different network structures, and referencing from one network to another is also possible. Therefore, a special garbage collection procedure for maintaining the consistency is required.

A mechanism for detecting the accesses to objects outside the cache uses hardware or software hooking (see ObjectStore ("User Guide Object Store Release 3.0 For OS/2 and AIX/xlc System," Object Design Inc., January 1994, pp. 9 to 11). In this system, the cache controller can detect such an access and invoke the cache routine without any extra control code in the application program.

The above described methods for determining the range of objects to be cached can not dynamically change objects to be cached in accordance with the various execution contexts.

Therefore, it is one object of the present invention to provide a method for dynamically changing objects to be cached in accordance with the various execution contexts.

It is another object of the present invention to provide a method for maintaining the consistency among whole cached objects even after the caching strategy changes dynamically.

It is an additional object of the present invention to provide a data structure in which objects to be cached can be dynamically changed.

It is a further object of the present invention to enable the customization of objects to be cached in accordance with the characteristic of an application program.

It is still another object of the present invention to reduce the dynamic calculation costs for determining objects to be cached.

SUMMARY OF THE INVENTION

First, an explanation will be given for a data structure which enables to dynamically change objects to be cached. At the least, classes of objects in the data structure is hierarchically arranged in a plurality of levels. Whether an object is cached or not is determined by the level of the class that the object belongs to. In addition, for each level, a class of a root object is defined that is an origin object for calculations to determine objects to be cached when a first object of a first class at a certain level refers to a second object of a second class at another level. Generally, the root object is either an object of a class at the certain level from which the references can be traced to the second object of the second class, or the second object of the second class.

Therefore, the root object may be either the first object of the first class at the certain level, which is a reference source object, or the second object of the second class in said another level, which is a reference destination object. At this time, the process for detecting the root object when determining objects to be cached becomes simple.

According to the depth of the process, a programmer of an application program can define classes hierarchically organized into levels to efficiently cache objects. In addition, this data structure may be defined by a user other than an application programmer because, in the caching process explained below, information inherent to an application program is not employed and caching is performed independently of the logic inherent to the program.

Furthermore, it is possible to define, for each set of the first and second classes, or for the first class, a group comprising classes of objects which can be directly or indirectly traced from the first object of the first class and belong to said another level when the first object of the first class at the certain level refers to the second object of the second class at said another level. In this case, not only the levels, but also the groups of classes, for which a reference between an object of a specific class and an object of another specific class is taken into account, are defined. Therefore, the groups of classes can be used to determine which objects are cached. That is, more detailed caching can be performed based on the reference relationship of objects.

When objects in the data structure in which only levels are defined are cached, following steps are performed: in response to that the first object of the first class at the certain level refers to the second object of the second class at said another level, detecting classes at said another level; and specifying, as objects to be cached, objects that have not yet been cached and that can be traced from the first object of the first class, and that belong to said another level.

A following step may be further included: specifying, as objects to be cached, objects that have not yet been cached and that can be traced from the first object of the first class except objects belonging to said another level and a reference destination object if a reference occurs between levels in an ascending order of levels to be cached. This indicates caching when there is a reference between levels in a descending order of levels to be cached.

When objects in a data structure in which object classes are hierarchically arranged also in groups are cached, following steps are performed: in response to that a third object of a third class at one level refers to a fourth object of a fourth class at another level, calculating a group defined by a set of the third class and the fourth class or the third class; and specifying as an object to be cached, an object of a class that has not yet been cached and that can be traced from the third object of the third class, and that belongs to the group defined by the set of the third class and the fourth class or the third class. As a result, caching consonant with the execution condition can be performed in accordance with the reference from an object of a specific class to an object of another specific class.

Furthermore, a following step may be performed: specifying, as an object to be cached, an object that has not yet been cached and that can be traced from the third object of the third class except objects of classes that belong to the group defined by the set of the third and the fourth classes or the third class and a reference destination object if a reference occurs between levels in an ascending order of levels to be cached. This indicates caching when there is a reference between levels in a descending order of levels to be cached.

The above described caching methods are performed based on the levels of the classes or the groups of the classes. However, the same object is not always cached, even in the same class. Thus, dynamic caching can be performed according to the execution status or the usage condition.

A method for discarding objects in a cache comprises the steps of: detecting a key object for a level n, wherein the key object is an object of a class at the level n−1 in the cached order and refers to an object of a class at the level n; invalidating a reference from the detected key object for the level n to the object of the class at the level n; and discarding objects of classes that belongs to the level n and subsequent levels and that can be traced from the key object for the level n. In this case, the objects at the n−th level and the. subsequent in the caching order are discarded based on the key object for level n, which is an object of a class at the n−1−th level in the caching order and refers to an object of a class at the level n, so that the consistency of the reference relationship can be maintained. This method is initiated upon receipt of an instruction from another program and etc.

The above method can be implemented by a program or by a dedicated apparatus. Such a modification on the implementation is normally performed by one having ordinary skill in the art. It is also performed by one having ordinary skill in the art that the above described program and data structure are stored on a storage medium, such as a CD-ROM or a floppy disk.

BRIEF DESCRIPTION OF THE DRAWINGS

Preferred embodiments of the present invention will now be described, by way of example only, with reference to the accompanying drawings in which.

DETAILED DESCRIPTION OF THE PREFERRED EMBODIMENTS OF THE INVENTION

Figure 1:
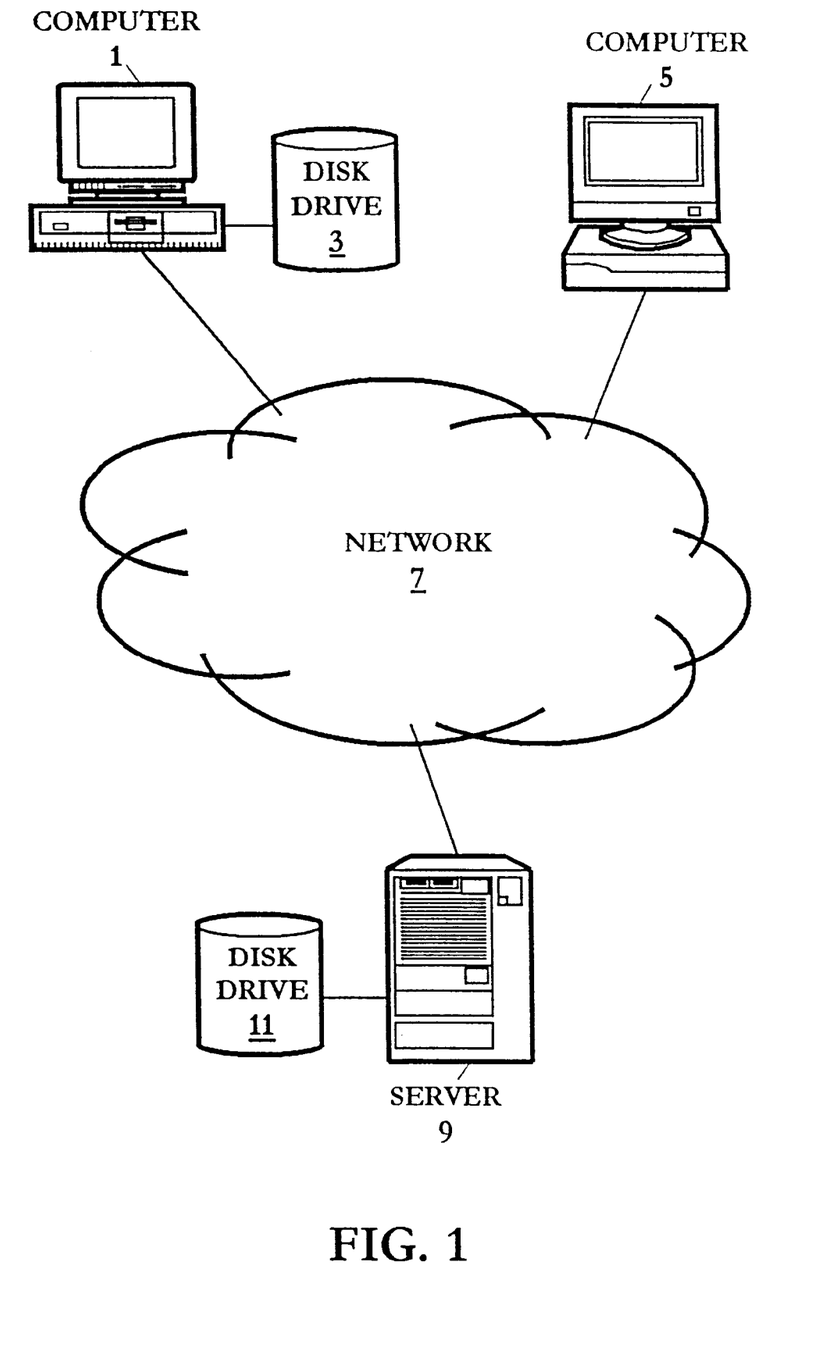
FIG. 1 is a diagram illustrating an example computer system according to the present invention.

FIG. 1 shows an example computer system according to the present invention. In the computer system, computers 1 and 5 are connected via a network 7 to a server 9. Disk drives 3 and 11 are respectively connected to the computer 1 and the server 9. When the computer 1 uses objects on a medium in the disk drive 11 connected to the server 9, it stores objects to be cached, which are determined by the present invention, in a main memory (not shown) in the computer 1 or on a medium in the disk drive 3. The computer 5, which has no disk drive, performs caching to the main memory (not shown). The computer 1 may employ the present invention when reading to the main memory objects stored on the medium in the disk drive 3 connected to the computer 1. At this time, the computer 1 need not be connected to the network 7. Furthermore, not only a fixed network may be employed to connect the computer 1 or 5 to the server 9, but also a wireless connection may also be employed. As needed, a telephone line may be employed for this connection.

Figure 2:
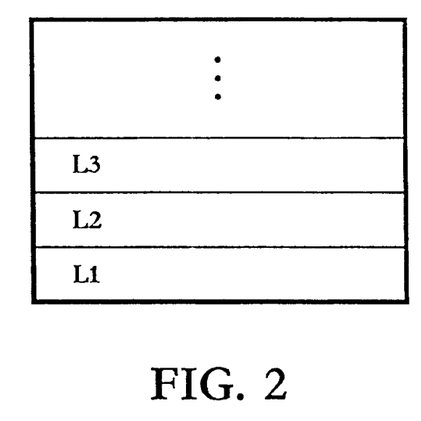
FIG. 2 is a diagram illustrating an example hierarchical data structure according to the present invention.

A brief explanation will now be given for an algorithm executed by the server 9 (or the computer 1 when caching objects of the data structure stored on the medium in the disk drive 3) and the data structure of objects stored on the medium in the disk drive 11 (or the disk drive 3). As shown in FIG. 2, the classes of objects are arranged in levels. For example, the lowest level L1 includes classes of objects used for the outline process or classes of objects uniformly used in the overall processing. The classes at higher levels are of objects used for detailed processing.

Figure 3:
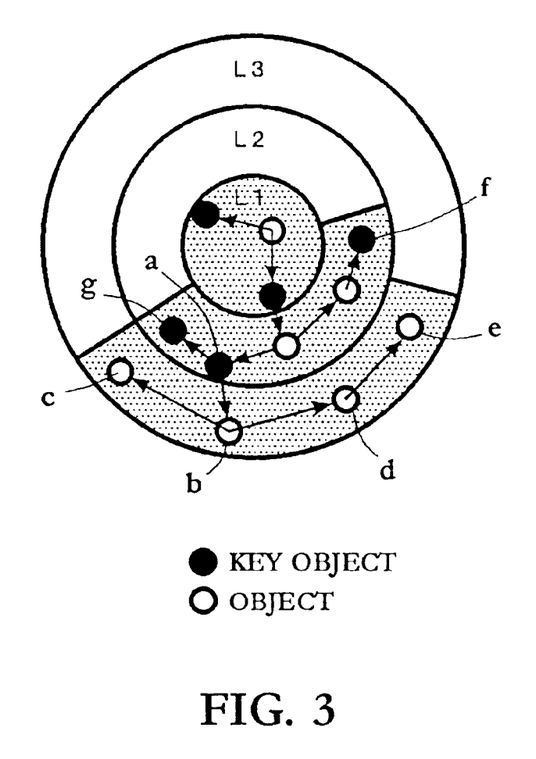
FIG. 3 is a diagram illustrating an example caching condition employing the present invention.

FIG. 3 shows concentric circles that represent the sets of objects to be processed at individual levels. The most inner circle designates level 1, and the higher levels are represented by external circles. The sizes of the circles correspond to the number of objects included in the individual levels. Only objects at level 1 are cached at the beginning of the process.

The small bit circles and small black dots in concentric circles represent objects that have been processed. The arrows represent the reference relationships between objects, and also the partial order in which the objects are actually activated. The sets of objects to be cached as the process proceeds are represented by hatching. In the course of the processing, objects at level 2 are partially activated to perform detailed processing for the specific object at level 1. Similarly, objects at level 3 are partially activated to perform detailed processing for the specific object at level 2.

Special objects exist that is in the cached objects at a preceding level in order to acquire a timing to initiate the following detailed process. This object is termed a key object for the level at which an object accessed by the key object is resident. In FIG. 3, the key objects are represented as small black dots. In this case, the key objects also serve as origins for calculating objects to be cached at the next level (a level to which an object accessed by the key object belongs). The origin object is called a root object. Generally, the key object is not identical to the root object, which can be determined by using domain specific information of an application program.

When an access from the key object to an object at the next level occurs, the calculation of objects to be cached is initiated. That is, objects of classes at the next level are collected that can be traced from the root object. In the example of FIG. 3, when an object b at level 3 is accessed from an object a, which is the key object at level 3 and also the root object, objects b, c, d and e at level 3, which can be traced from the object a are designated as objects to be cached.

In addition, sets of classes can be defined in more detail than the set by levels, in accordance with access patterns between objects, in order to cope with a situation where a plurality of types of processes exist even at the same level. In the example of. FIG. 3, the objects b, c, d and e can be defined as a group that is designated by the objects a and b, in addition to the levels.

This level is employed to dispose of one part of a cache. That is, objects of classes belonging to a specified level and a higher level are released. Objects at a specified level can not be released if objects at the higher level are not released. This is reasonable because of the fact that the levels represent the degree of the detail of a process. To actually discard objects, all the key objects at a specific level are collected, and then objects of classes at higher levels that can be traced from the key objects need be released. In order to invalidate a reference pointer by the release of the objects, only the key objects at the specified level need be mentioned, and other processing for the cache, such as garbage collection, is not required. For example in FIG. 3, when classes at level 3 and higher are to be discarded, key objects a, f and g for level 3 are collected, and objects b, c, d and e, which can be traced from them, are discarded. In addition, the reference pointers from the key objects a, f and g are invalidated.

Based on the preceding outline explanation, a more detailed explanation will be given for the present invention. First, several definition and representation methods will be described.

(1) Representation of Classes

A class is represented as C or $C_i$, where a subscript character "i" represents the number of a class. A superscript character indicates the number of a level to which a class belongs.

(2) Representation of Objects

An object is represented as either O or $O_i$. The subscript and the superscript characters have the same definition as have those of the classes. The class to which O belongs is represented as Class (O).

(3) Others

When object $O_i$ includes a reference to object $O_j$, this is represented by $O_i \rightarrow O_j$, which also represents an access pattern that $O_i$ refers to $O_j$ during the execution of a program.

When a reference from class $C_i$ to class $C_j$ occurs, it is represented by $C_i \rightarrow C_j$, particularly, when Class $(O_i)=C_i$ and Class $(O_j)=C_j$, it is represented by $O_i \rightarrow O_j \leftrightarrow C_i \rightarrow C_j$.

Furthermore, in a case where references can be indirectly traced, this is represented by $C_i \rightarrow^* C_j$ (closure: the access pattern set includes the case that no trace of references occurs and that a reference source class is identical with a reference destination) or by $C_i \rightarrow_+ C_j$ (positive closure: the set does not include the case that no trace occurs.). In particular, when an intermediate class in the trace is designated, it is represented like $C_i \{\rightarrow C_k\}^* \rightarrow C_j$ or $C_i \{\rightarrow C_k\}_+ \rightarrow C_j$.

A. Definition of a Data Structure

A data structure for objects to be cached will now be defined. Level (1) is a set of classes of objects to be cached at the first process. This is represented as Level $(1)=\{C_1^1, C_2^1, C_3^1, \ldots\}$. When the root object of level 1 is $O_{root}$, all instances of $C_i^1$ (i=1, ...) that can be traced from $O_{root}$ are cached upon the execution of the program. An arbitrary class to be included in level (1) can be designated by an application programmer in accordance with the property of the application program.

Level (n) is a set of classes of objects to be cached at level n. A set of classes at level n−1 whose objects refer to objects at level n is defined as Key(n). This is represented by the following expression:

$$Key(n) \equiv \left\{ C_i^{n-1} \in Level(n-1) \,\middle|\, \exists\, C^n \notin \bigcup_{1 \leq k \leq n-1} Level(k), C_i^{n-1} \rightarrow C^n \right\}$$

The objects of classes in Key(n) are named as key objects.

Group $(C_i^{n-1} \rightarrow C_j^n)=\{C_j^n, C_{ij1}^n, C_{ij2}^n, \ldots\}$, and function $f_{getroot}$ $(C_i^{n-1} \rightarrow C_j^n) \rightarrow C_{ij-root}$ can be designed and defined for an arbitrary access pattern $C_i^{n-1} \rightarrow C_j^n$ from the key object ($C_i^{n-1}$ is the class of the key object and $C_j^n$ is not a class at level 1 to level n−1). When the access pattern $C_i^{n-1} \rightarrow C_j^n$ (an access between objects belonging to both classes) is executed, $C_j^n, C_{ij1}^n, C_{ij2}^n, \ldots$, whose objects can be traced from the root object of $C_{ij-root}$ that can be determined using the function $f_{getRoot}$, are derived from the definition of Group $(C_i^{n-1} \rightarrow C_j^n)$. The root object is the origin from which $C_j^n, C_{ij1}^n, C_{ij2}^n, \ldots$ can be traced, and is limited to an object belonging to a class at a level n−1 or an object referred to from the key object. This is represented by the following expressions:

$$Group\,(C_1^{n-1} \rightarrow C_j^n) \subset \left\{ C^n \,\middle|\, C_i^{n-1} \rightarrow_+ C^n, C^n \notin \bigcup_{1 \leq k \leq n-1} Level(k) \right\}$$

$C_{ij-root} \in$ Level $(n-1) \lor (C_{ij-root}=C_j^n) \land (C_{ij-root} \rightarrow^* C_j^n)$ [Expression 3]

The level (n) can be re-defined as follows.

$$Level(n) \equiv \bigcup_{\forall (C_i^{n-1} \rightarrow C_j^n), C_i^{n-1} \in key\,(n)} Level\,(C_i^{n-1} \rightarrow C_j^n)$$

When this process is repeated until Key(n)=φ, the data structure Level (n) (n≧2), {Level (1), Group $(C_i^1 \rightarrow C_j^2)$, ... . Group $(C_i^{n-1} \rightarrow C_j^n)$}, the function $f_{getRoot}$ and Key(n) can be designed and defined. These are employed to decide which object is to be cached. This process will be explained next.

In an actual application program, Group $(C_i^{n-1} \rightarrow C_j^n)$ may be a fixed set of classes, independent of the access pattern (Group definition are not required), or may be derived from a single parameter; a class of key objects (Group $(C_i^{n-1})$). If a key object and the class of its reference destination object are directly employed for the parameters of the function $f_{getRoot}$ the following process is simplified.

The data structure designed and defined herein is stored on a disk in the disk drive 11 of the server 9 or on a disk in the disk drive 3 of the computer 1 in FIG. 1, and may also be stored on a storage medium in a portable storage device.

B. Cache Control Algorithm

The cache control algorithm comprises: (1) a process for caching Level (1) at the beginning of processing; (2) a process for caching new objects when an access pattern $O^n \rightarrow O^{n+1}$ appears in the cache during the processing for level n; and (3) a process for discarding objects that are no longer required. In process (1), since when the root object of level 1 is $O_{root}$, all instances of $C_i^1$ (i=1, ...) that can be traced from $O_{root}$ upon the execution of a program are cached, no further explanation for this will be given. Although a mechanism for managing the consistency of a cache is also required, since when the original data in the remote site is updated by writing back the contents of the cache, this updating process need only be performed by individual objects and the conventional method can therefore be employed in this instance, no further explanation will be given.

(2) Process for caching new objects when the access pattern $O^n \rightarrow O^{n+1}$ appears in the cache during the processing for level n. Assume that the objects up to level n have been cached. The algorithm of determining objects to be cached when the access pattern $O^n \rightarrow O^{n+1}$ appears will be explained while referring to FIGS. 4 and 5.

Figure 4:
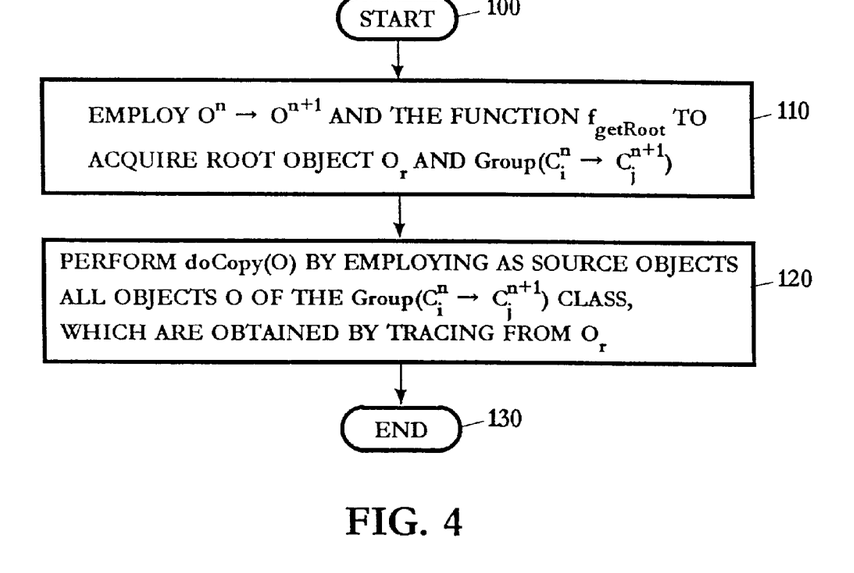
FIG. 4 is a flowchart showing an algorithm for selecting an object to be cached.

(a) $O^n \rightarrow O^{n+1}$ and the function $f_{getRoot}$ are employed to calculate a corresponding root object $O_r$ and a set of classes to be cached, Group $(C_i^n \rightarrow C_j^{n+1})$ (step 110). For a specific data structure defined by application programmers, Group $(C_i^n \rightarrow C_j^{n+1})$ may not be defined, but instead, Level (n+1) or Group $(C_i^n)$ is defined. When $O_r$ is defined by using the property inherent to the application program, $O_r$ is employed. Even when $O_r$ is not defined, $O_r$ can be easily acquired since $O_r=O^n$, or $O_r=O^{n+1}$ in many cases.

(b) All the objects O of classes in the Group $(C_i^n \rightarrow C_j^{n+1})$, which can be acquired by tracing the reference from $O_r$, are employed as source objects to execute doCopy(O) (step 120). The doCopy (O) process will be explained later referring to FIG. 5. Since generally some objects of the Group $(C_i^n \rightarrow C_j^{n+1})$ may not be able to be traced from $O_r$, such an object can not serve as the source object of doCopy. The object O is defined as follows: When Class $(O_r)=C_j^{n+1}$, $O=O_r$. In the other cases, O satisfies the following expression:

$O_r\{\rightarrow O'\}^* \rightarrow \forall O$ and Class $(O') \in$ Level $(n)$ and Class $(O) \in$ Level $(C_i^n \rightarrow C_j^{n+1})$ It should be noted that the set of objects to be cached is represented by Activated$_n$ $(O^n \rightarrow O^{n+1})$ and initially Activated$_n$ $(O^n \rightarrow O^{n+1})=\phi$. Then, the doCopy (O) (FIG. 5) is recursively performed.

Figure 5:
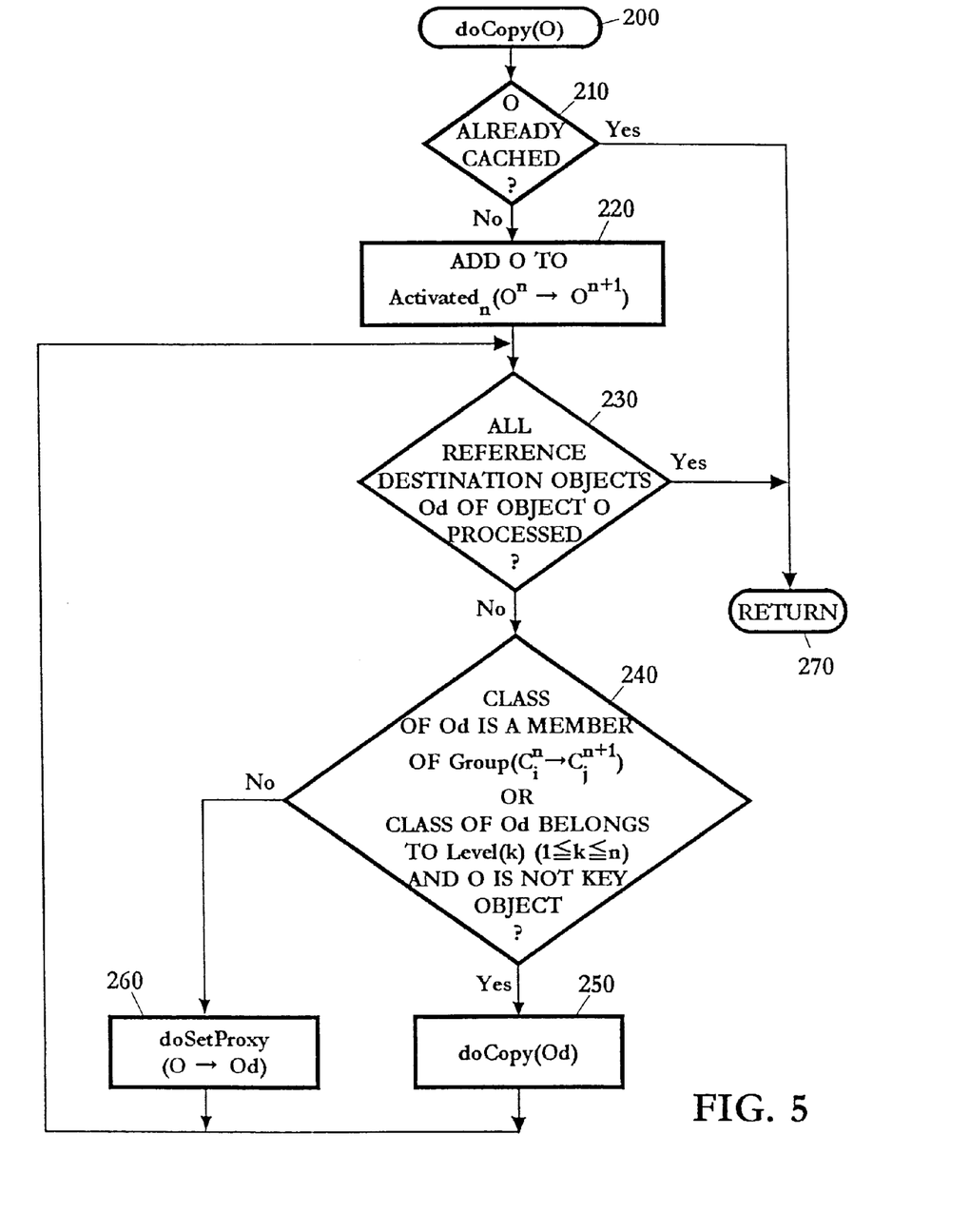
FIG. 5 is a flowchart showing a doCopy (O) algorithm employed in FIG. 4.

(c) In the doCopy(O) process, first, it is checked whether object O has been cached (step 210). When object O has been cached, program control returns to the caller process (step 270). When object O has not yet been cached, object O is added to Activated$_n$ $(O^n \rightarrow O^{n+1})$. Following this, the process at step 240 and the following steps are performed for a reference destination object Od of object O (step 230). Then, it is checked whether all the reference destination objects Od of the object O have been processed. When all the reference destination objects Od have been processed, program control returns to the caller process.

When there are unprocessed reference destination objects Od, it is checked whether (a) the class of the objects Od is a Group($C_i^n \rightarrow C_j^{n+1}$) member, or whether (b) the class of the objects Od belongs to Level(k) (1≦k≦n) and the reference source object O is not a key object (step 240). When condition (a) or (b) is satisfied, doCopy(Od) is initiated (step 250). The reference pattern from O to Od is recorded. It should be noted that reference destination objects of the reference destination objects Od are processed in the doCopy(Od). Condition (a) can be described as:

$$\text{Class }(Od) \in \text{Level }(C_i^n \to C_j^{n+1}) \quad [\text{Expression 5}]$$

And condition (b) can be described as:

$$Class(Od) \in \bigcup_{1 \le k \le n} Level(k) \land Class(O) \notin \bigcup_{1 \le k \le n+1} key(k)$$

Condition (b) is a required condition for preventing extra caching when the reference between levels occurs reversely.

When any condition at step 240 is not satisfied, because it is assumed that either the class of the reference destination object Od is a member of Level (n+2) or the reference source object is a key object at a level of from 1 to n+1, the object Od and the following object are not designated as objects to be cached. However, when an access from the object O to the object Od occurs, the reference relationship is registered by doSetProxy (O→Od), so that the process in FIGS. 4 and 5 is initiated (step 260).

When the doCopy (O) process has been performed recursively for all the source objects O, the process in FIG. 4 is terminated. Thereafter, the objects to be cached in the Activated$_n$ ($O^n \to O^{n+1}$) are cached.

Figure 7:
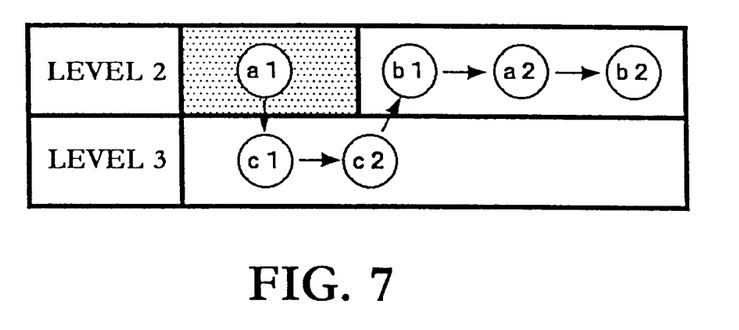
FIG. 7 is a diagram illustrating a data structure for explaining a doCopy (O) algorithm.

An example of the doCopy(O) process will now be explained. Assume that Level (2)={A, B} and Level (3)={C}, and that the objects in class A are a1, a2, a3, . . . , the objects in class B are b1, b2, b3, . . . and the objects in class C are c1, c2, c3, . . . The reference relationship among them is a1→c1→c2→b1→a2→b2→ . . . , as shown in FIG. 7. Key(3)={A}, and the shaded portion in FIG. 7, i.e., the object al, is first cached.

When the access a1→c1 occurs, the process in FIG. 4 is begun (c1 is the root object here), and first the docopy (c1) process is called.

1. First Execution (DoCopy(c1))

The object c1 is selected as an object to be cached (step 220). Since the reference destination object c2 of the object c1 satisfies the first condition at step 230, doCopy(c2) is called.

2. First Recursive Execution (DoCopy(c2))

Object c2 is selected as an object to be cached. Since reference destination object b1 of object c2 is an object in class B, it is not an object at Level (3), and does not satisfy the first condition at step 230. However, since class B belongs to Level (2) and the class C of the reference source object c2 is not in Key(3)={A}, the second condition is satisfied. Therefore, doCopy(b1) is called.

3. Second Recursive Execution (DoCopy(b1))

Object b1 is selected as an object to be cached. Since class A of reference destination object a2 of object b1 belongs to Level (2), this is not an object at Level (3) and does not satisfy the first condition at step 230. However, since class A belongs to Level (2), and class B of reference source object b1 is not in Key(3)={A}, the second condition is satisfied. Thus, doCopy(a2) is called.

4. Third Recursive Execution (DoCopy(a2))

Object a2 is selected as an object to be cached. Since class B of the reference destination object b2 of the object a2 belongs to Level (2), it is not an object at Level (3), and does not satisfy the first condition at step 230. In addition, since class A of reference source object a2 is in Key(3)={A} while class B is an object at Level (2), the second condition is not satisfied either. Program control therefore moves to step 260, whereat doSetProxy(a2→b2) is set and step 250 ends.

The processes (1) and (2) are those that are performed by the server 9 in FIG. 1. When the computer 1 performs caching from the disk drive 3, the computer 1 performs the processes (1) and (2).

(3) Process for discarding Objects that Are No Longer Required.

The discarding of a cache is basically performed at each level. All the objects at level n and higher are discarded. But objects at a specific level can not be discarded if objects at higher levels are not discarded in a cache because of the consistency in the references. The timing for the discarding and the selection of a level differ depending on the application program and are determined by another program.

Figure 6:
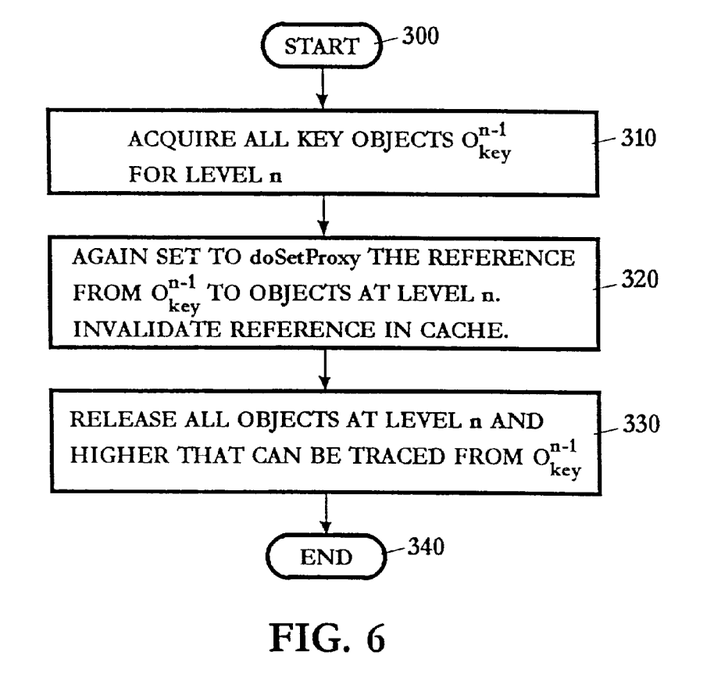
FIG. 6 is a flowchart showing a cache discard algorithm.

A case where objects at level n and higher are to be discarded will be explained referring to FIG. 6. First, all the key objects $O_{key}^{n-1}$ for level n are acquired (step 310). As described above, the key object is defined as an object of a class at level n−1 that refers to the objects at level n. Therefore, the key object for level n is an object at level n−1. The reference from the objects $O_{key}^{n-1}$ to the objects at level n is processed by doSetProxy (step 320). That is, the above reference is registered so that the processes in FIGS. 4 and 5 begin when the reference from $O_{key}^{n-1}$ to an object at level n occurs again. As a result, the reference in the cache is invalidated. Finally, only the objects at level n and higher that can be traced from the objects $O_{key}^{n-1}$ are released (step 330).

As described above, when the reference that can be traced from the key object is precisely processed, the consistency in the reference relationship in the cache can be maintained. In other words, referring from an alive object in the cache to a released object does not occur. There may be an object at lower than level n that is not referred to from any object, but such an object can be salvaged by the well-known garbage collection process.

The process (3) is performed by the computer 1 or 3.

Class as defined here does not always match the class in a programming language. Class in this system is considered to be one for which the number of instances is meaningful when considering objects to be cached. Actually, however, in many cases the class in this invention may match a general class, except for Level (1). As for Level (1), a different destination method from that for the general class should be employed.

Figure 8:
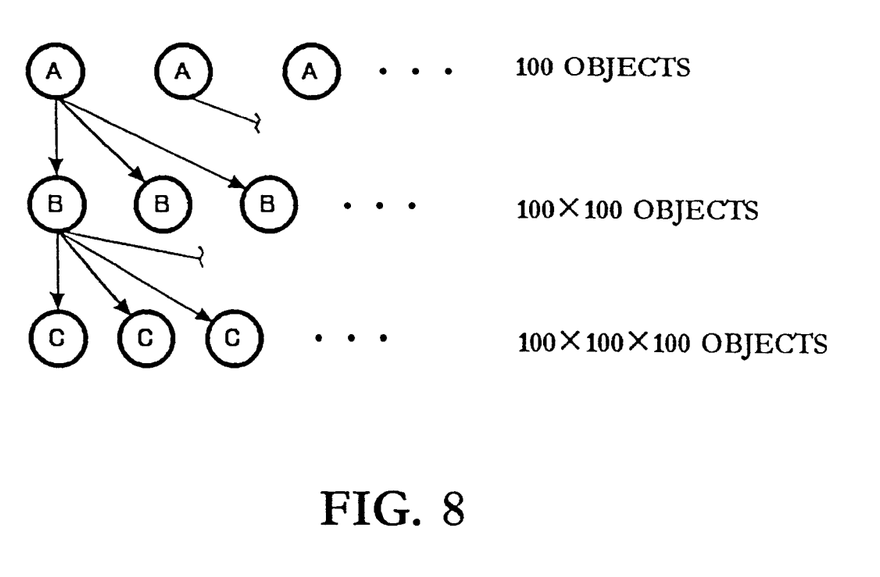
FIG. 8 is a diagram illustrating the hierarchical class structure for explaining one embodiment of the present invention.

Assume for a specific embodiment that in the class structure in FIG. 8, 100 objects are members of class A, that 100 objects in class B are linked with each object in class A, and that 100 objects in class C are linked with each object in class B. Since the total number of objects in such a class structure exceeds one million, it is not realistic for all the objects to be cached at one time. Suppose that three processes for caching are executed in the application program: a process Pa for handling only objects of class A, a process Pb for handling one object in class A and all the objects in class B appended thereto, and a process Pc for handing one object each in classes A and B, and all the objects in class C appended thereto.

Then, the following data structure can be determined.

Level (1)={A}

Key(2)={A}, Level (2)={B}, $f_{getRoot}(a \to b)=a$

Key(3)={C}, Level (3)={C}, $f_{getRoot}(b \to c)=b$ (Class(a)=A, Class(b)=B, Class(c)=C)

Since the process Pa is performed first at the beginning of the processing, all the objects of class A that correspond to Level (1) are cached, i.e., 100 class A objects are cached. When the process Pb is initiated and specific object a of class A accesses object b of class B, Activated$_2$ (a→∀b) at Level(2) is newly cached. Similarly, when the process Pc is initiated, Activated$_3$ (b→∀c) is cached. At this time, the number of objects present in the cache is 300, which is an appropriate number.

A process having a completely different access pattern for the class structure in FIG. 8 may be employed. That is, in a process P'b that is begun when object a of class A accesses object b of class B, the object of class C that can be traced from class B is also regarded as an object to be cached. In other words, while in the first example, the network of objects is processed using an access pattern wherein priority is given to width, in this process, the network of objects is processed using an access pattern wherein priority is given to depth. The data structure is re-defined as follows.

Level (1)={A}

Key(2)={A}, Level (2)={B, C}, $f_{getRoot}$ (a→b)=b

When object b is accessed, all the objects in class C that can be traced therefrom can be cached. As a result, an adequate number of required objects can be cached in this process. It should be noted that when the objects in class B are accessed, 201 objects are cached.

Assume that, as another caching method, only one object is cached in each process when an object of class A accesses an object of class B, and when an object of class B accesses an object of class C. When the object of class A accesses the object of class B, it is impossible to determine which object of the 100 objects in the following class C is to be cached without analyzing the contents of the program. Therefore, at this access, only one object at the class B level is cached. When the access proceeding from class B to class C occurs, one object of class C is cached as the cache for the next level. The data structure at this time is as follows.

Level (1)={A}

Key(2)={A}, Level (2)={B}, $f_{getRoot}$ (a→b)=b

Key(3)={B}, Level (3)={C}, $f_{getRoot}$ (a→b)=b

When class C is accessed, 102 objects are cached.

It should be noted in these examples that a plurality of caching methods can be used by changing the data structure, without a change in the contents of an application program and a cache algorithm being necessary. That is, with the present invention, an arbitrary caching method can be designed in accordance with the properties inherent to the application program, and performance tuning can be easily made after the application program has been developed.

Accordingly, the present invention provides a method for dynamically changing objects to be cached in accordance with the processes performed. Further, a method can be provided for maintaining the consistency in caching relative to dynamic changes in objects to be cached. In addition, a data structure can be provided wherein an object to be cached can be dynamically changed. Furthermore, a method can be provided for enabling the customization of objects to be cached in accordance with the properties of an application program. Moreover, the dynamic calculation costs for determining objects to be cached can be reduced.

While the invention has been particularly shown and described with respect to preferred embodiments thereof, it will be understood by those skilled in the art that the foregoing and other changes in form and details may be made therein without departing form the spirit and scope of the invention.

Having thus described my invention, what I claim as new, and desire to secure by Letters Patent is:

1. A method for selecting an object to be cached in a data structure of object classes hierarchically arranged in a plurality of levels, said method comprising the steps of: in response to that a first object of a first class at one level refers to a second object of a second class at another level, detecting classes at said another level; and specifying, as said object to be cached, an object of a class at said another level that has not yet been cached and that can be traced from said first object of said first class.

2. The method according to claim 1, further comprising a step of: specifying, as said object to be cached, an object that has not yet been cached and that can be traced from said first object of said first class, except an object of a class at said another level and a reference destination object when a reference occurs between levels in an ascending order of levels to be cached.

3. A method for selecting an object to be cached in a data structure comprising object classes hierarchically arranged in a plurality of levels, wherein a group is defined for each set of a first class at one level and a second class at another level, and said group comprises a class of an object at said another level that can be directly or indirectly traced from said first object of said first class at said one level when said first object of said first class at said one level refers to a second object of said second class at said another level, said method comprising the steps of: in response to that a third object of a third class at a certain level refers to a fourth object of a fourth class at a specific level, calculating a group defined by the set of said third class and said fourth class; and specifying, as said object to be cached, an object of a class that has not yet been cached and that can be traced from said third object of said third class, and that belongs to said group defined by said set of said third class and said fourth class.

4. The method according to claim 3, further comprising a step of: specifying, as said object to be cached, an object that has not yet been cached and that can be traced from said third object of said third class, except an object of a class that belongs to said group defined by the set of said third and said fourth classes and a reference destination object if a reference occurs between levels in an ascending order of levels to be cached.

5. A method for selecting an object to be cached in a data structure comprising object classes hierarchically arranged in a plurality of levels, wherein a group is defined for each first class at one level, and said group comprises a class of an object at another level that can be directly or indirectly traced from a first object of said first class at said one level when said first object of said first class at said one level refers to a second object of a second class at said another level, said method comprising the steps of: in response to that a third object of a third class at a certain level refers to a fourth object of a fourth class at a specific level, calculating a group defined by said third class; and specifying, as said object to be cached, an object of a class that has not yet been cached and that can be traced from said third object of said third class and that belongs to said group defined by said third class.

6. A method for discarding cached objects of classes at an n-th level (level n) and subsequent levels in a caching order of levels in a data structure of object classes hierarchically arranged in a plurality of levels, said method comprising the steps of: detecting a key object for said level n, said key object belonging to an n-1-th level in said caching order and referring to an object of a class at said level n; invalidating the reference to said object of said class at said level n from the detected key object for said level n; and discarding said objects of classes at said level n and subsequent levels that can be traced from said key object for said level n.

7. A computer for selecting an object to be cached in a data structure of object classes hierarchically arranged in a plurality of levels, said data structure stored on a storage device, said computer comprising: a class detector for detecting, in response to that a first object of a first class at one level refers to a second object of a second class at another level, classes at said another level; and an object specification processor for specifying, as said object to be cached, an object of a class at said another level, that has not yet been cached and that can be traced from said first object of said first class.

8. The computer according to claim 7, wherein said object specification processor specifies, as said object to be cached, an object that has not yet been cached and that can be traced from said first object of said first class, except an object at said another level and a reference destination object if a reference occurs between levels in an ascending order of levels to be cached.

9. A computer for selecting an object to be cached in a data structure comprising object classes hierarchically arranged in a plurality of levels, wherein said data structure is stored on a storage device, and a group is defined for a set of a first class at one level and a second level at another level, and said group comprises a class of an object at said another level, that can be directly or indirectly traced from a first object of said first class when said first object of said first class at said one level refers to a second object of said second class at said another level, said computer comprising:

a group detector for detecting, in response to that a third object of a third class at a certain level refers to a fourth object of a fourth class at a specific level, a group defined by a set of said third class and said fourth class; and an object specification processor for specifying, as said object to be cached, an object of a class that has not yet been cached and that can be traced from said third object of said third class and that belongs to said group defined by said set of said third class and said fourth class.

10. The computer according to claim 9, wherein said object specification processor specifies, as said object to be cached, an object that has not yet been cached and that can be traced from said third object of said third class, except an object of a class that belongs to said group defined by the set of said third and said fourth classes and a reference destination object if a reference occurs between levels in an ascending order of levels to be cached.

11. A computer for discarding cached objects of classes at an n–th level (level n) and subsequent levels in a caching order of levels in a data structure of object classes hierarchically arranged in a plurality of levels, said computer comprising: a key object detector for detecting a key object for said level n, said key object belonging to an n–1–th level in said caching order and referring to an object of a class at said level n; a reference invalidation processor for invalidating the reference to said object of said class at said level n from the detected key object for said level n; and an object discarding processor for discarding objects of classes at said level n and subsequent levels, that can be traced from said key object for said level n.

12. A storage medium for storing a program for causing a computer to select an object to be cached in a data structure of object classes hierarchically arranged in a plurality of levels, said program comprising the steps of: in response to that a first object of a first class at one level refers to a second object of a second class at another level, detecting a class at said another level; and specifying, as said object to be cached, an object at said another level, that has not yet been cached and that can be traced from said first object of said first class.

13. The storage medium according to claim 12, wherein said specifying step includes a step of specifying, as said object to be cached, an object that has not yet been cached and that can be traced from said first object of said first class, except an object belonging to said another level and a reference destination object when a reference occurs between levels in an ascending order of levels to be cached.

14. A storage medium for storing a program for causing a computer to select an object to be cached in a data structure comprising object classes hierarchically arranged in a plurality of levels, wherein a group is defined for each set of a first class at one level and a second class at another level or for said first class, and said group comprises a class of an object at said another level, that can be directly or indirectly traced from said first object of said first class at said one level when said first object of said first class at said one level refers to a second object of said second class at said another level, said program comprising the steps of: in response to that a third object of a third class at a certain level refers to a fourth object of a fourth class at a specific level, calculating a group defined by a set of said third class and said fourth class or said third class; and specifying, as said object to be cached, an object of a class that has not yet been cached and that can be traced from said third object of said third class and that belongs to said group defined by said set of said third class and said fourth class or said third class.

15. The storage medium according to claim 14, wherein said specifying step includes a step of specifying, as said object to be cached, an object that has not yet been cached and that can be traced from said third object of said third class, except a reference destination object if a reference occurs between levels in an ascending order of levels to be cached.

16. A storage medium for storing a program for causing a computer to discard cached objects of classes at an n–th level (level n) and subsequent levels in a caching order of levels in a data structure of object classes hierarchically arranged in a plurality of levels, said program comprising the steps of: detecting a key object for said level n, said key object belonging to an n–1–th level in said caching order and referring to an object of a class at said level n; invalidating the reference to said object of said class at said level n from the detected key object for said level n; and discarding said objects of classes at said level n and subsequent levels that can be traced from said key object for said level n.

* * * * *

UNITED STATES PATENT AND TRADEMARK OFFICE
CERTIFICATE OF CORRECTION

PATENT NO. : 6,363,397 B1
DATED : March 26, 2002
INVENTOR(S) : Fumihiko Kitayama It is certified that error appears in the above-identified patent and that said Letters Patent is hereby corrected as shown below:

Title page,
Item [56], References Cited, OTHER PUBLICATIONS, insert:
-- San Francisco Project Technical Summery", IBM Network Computing, 1997pp. 1-14 --
-- ObjectStore User Guide, Release 3.0 For OS/2 and AIX/xlc System, Object Design Inc., Jan. 1994, pp. 42-44 --
-- User Guide ObjectStore Release 3.0 for OS/2 and IAX/xlc Systems", Object Design Inc., Jan 1994, pp. 9-11 --

Column 6,
Line 67, "$^{*}C_j$" should read -- $*C_j$ --

Column 7,
Line 47, "$^{*}C^n_j$" should read -- $*C^n_j$ --

Column 8,
Line 48, "$\{\rightarrow O'\}^{*}$" should read -- $\{\rightarrow O'\}*$ --

Signed and Sealed this

Twenty-fifth Day of February, 2003

JAMES E. ROGAN
*Director of the United States Patent and Trademark Office*